(12) United States Patent
Mizutani et al.

(10) Patent No.: US 6,736,167 B2
(45) Date of Patent: May 18, 2004

(54) BRAKE HOSE AND METHOD FOR MANUFACTURING BRAKE HOSE

(75) Inventors: Satoshi Mizutani, Aichi-ken (JP); Kenichiro Furui, Aichi-ken (JP); Taizo Ogawa, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/302,989

(22) Filed: Nov. 25, 2002

(65) Prior Publication Data

US 2003/0098083 A1 May 29, 2003

(30) Foreign Application Priority Data

Nov. 27, 2001 (JP) .......................................... 2001-360377

(51) Int. Cl.⁷ ................................................ F16L 11/00
(52) U.S. Cl. ...................... 138/126; 138/137; 138/141; 138/124
(58) Field of Search ................................. 138/126, 141, 138/124, 146, 137, 125

(56) References Cited

U.S. PATENT DOCUMENTS

| | | | | |
|---|---|---|---|---|
| 4,111,237 A | * | 9/1978 | Mutzner et al. ............ | 138/125 |
| 4,431,031 A | * | 2/1984 | Ettlinger ..................... | 138/109 |
| 4,734,305 A | * | 3/1988 | Sugimoto et al. .......... | 428/36.2 |
| 5,077,108 A | * | 12/1991 | Ozawa et al. .............. | 428/36.2 |
| 5,279,874 A | * | 1/1994 | Ichikawa et al. .......... | 428/36.8 |
| 5,445,191 A | * | 8/1995 | Green et al. ................ | 138/126 |
| 5,526,848 A | * | 6/1996 | Terashima et al. ......... | 138/125 |
| 5,660,210 A | * | 8/1997 | Ikeda et al. ................ | 138/126 |
| 5,922,811 A | * | 7/1999 | Suzuki et al. .............. | 525/240 |
| 6,037,062 A | | 3/2000 | Tsutsumi et al. .......... | 428/476.3 |
| 6,071,582 A | * | 6/2000 | Tangiku et al. ........... | 428/36.91 |
| 6,220,304 B1 | * | 4/2001 | Horiba et al. .............. | 138/126 |
| 6,626,211 B2 | * | 9/2003 | Mizutani et al. ........... | 138/126 |

FOREIGN PATENT DOCUMENTS

| | | |
|---|---|---|
| EP | 1 156 251 | 11/2001 |
| JP | 06-201076 | 7/1994 |
| WO | WO 01/48412 | 7/2001 |

* cited by examiner

Primary Examiner—Patrick Brinson
(74) Attorney, Agent, or Firm—Posz & Bethards, PLC

(57) ABSTRACT

A brake hose comprises reinforcing layers in a rubber base. The brake hose comprising an inner tube rubber layer that is made of a rubber material and has a flow path for flowing fluid; a lower yarn layer formed by braiding lower yarn around the inner tube rubber layer; an intermediate rubber layer made of a rubber material and located around the lower yarn layer; an upper yarn layer formed by braiding upper yarn around the intermediate rubber layer; and a cover rubber layer formed around the upper yarn layer. The intermediate rubber layer is formed from a sheet material having a Mooney viscosity of 10–40 Mv (minimum Mooney value) at 145° C.

13 Claims, 4 Drawing Sheets

BRAKE HOSE AND METHOD FOR MANUFACTURING BRAKE HOSE

This application claims the benefit of and priority from Japanese Application No. 2001-360377 filed Nov. 27, 2001, the content of which is incorporated herein by reference.

BACKGROUND OF THE INVENTION

1. Field of the Invention

The present invention pertains to a brake hose having two reinforcing yarn layers including a lower yarn layer and an upper yarn layer in a rubber base.

2. Description of the Related Art

A brake hose known in the conventional art is shown in FIG. 7 (JP 06-201076A). FIG. 7 is a cross-section of the main components of a conventional brake hose 200. Because the brake hose 200 must have high resistance against brake fluid pressure, it is formed from several layers of rubber and fiber yarn. The brake hose 200 comprises an inner tube rubber layer 202, a lower yarn layer 204, an intermediate rubber layer 206, an outer yarn layer 208, and a cover rubber layer 210.

The brake hose 200 is required to meet a higher pressure resistance standard than a coolant system hose or a fuel system hose. As fluid temperatures and pressure levels of automobile system have increased in recent years, the demand for higher pressure resistance has increased as well.

The pressure from the fluid flowing in the flow path 201 inside the brake hose 200 is transmitted from the inner circumference area of the brake hose 200 to the outer circumference area thereof. In other words, the pressure is transmitted to the inner tube rubber layer 202, the lower yarn layer 204, the intermediate rubber layer 206, the upper yarn layer 208 and the cover rubber layer 210, causing each layer to expand. Each layer has a binding force that operates against the pressure exerted by the fluid and inhibits expansion of such layer. The inner tube rubber layer 202, the intermediate rubber layer 206 and the cover rubber layer 210 are highly elastic, and are responsible for no more than 10% of the total binding force, while the majority of the binding force is possessed by the lower yarn layer 204 and the upper yarn layer 208. Consequently, increasing the binding force of the lower yarn layer 204 and the upper yarn layer 208 increases the durability and expansion resistance (i.e., resistance to cubical expansion) provided by the brake hose 200. As a result, increasing both of these characteristics by changing the type of yarn material used and the braiding method of the yarn layers has been examined.

SUMMARY OF THE INVENTION

An object of the present invention is to provide a brake hose that offers increased durability and expansion resistance.

In accordance with one embodiment of the present invention, a brake hose comprises reinforcing layers in a rubber base. The brake hose comprising an inner tube rubber layer that is made of a rubber material and has a flow path for flowing fluid; a lower yarn layer formed by braiding lower yarn around the inner tube rubber layer; an intermediate rubber layer made of a rubber material and located around the lower yarn layer; an upper yarn layer formed by braiding upper yarn around the intermediate rubber layer; and a cover rubber layer formed around the upper yarn layer. The intermediate rubber layer is formed from a sheet material having a Mooney viscosity of 10–40 Mv (minimum Mooney value) at 145° C.

The Mooney viscosity is a value reflecting measurement of the viscosity of non-vulcanized rubber at 145° C. based on the K6300 test promulgated under JIS (Japanese Industrial Standards).

In the brake hose pertaining to the present invention, the pressure exerted by the fluid flowing in the flow path is transmitted from the inner circumference area of the brake hose to the outer circumference area thereof, i.e., from the interior of the rubber base to the lower yarn layer and the upper yarn layer, causing each such layer to expand. A binding force that restricts the expansion of the brake hose in resistance to the pressure from the fluid is generated. The rubber base is responsible for no more than 10% of the total binding force due to its high elasticity, while the majority of the binding force is exerted by the lower yarn layer and the upper yarn layer.

It is preferred that the intermediate rubber layer 16 have a thickness of 0.1–0.25 mm. This is because if the thickness is less than 0.1 mm, the intermediate rubber layer 16 becomes too thin and cannot be braided around the lower yarn layer 14, while if the thickness exceeds 0.25 mm, the intermediate rubber layer is so thick that the intermediate rubber layer 16 functions as an elastic layer that permits displacement of the lower yarn layer 14, and the displacement-inhibiting effect of the lower yarn layer is diminished.

As the rubber material for the sheet, EPDM, isobutylene-isoprene copolymer rubber (IIR) or natural rubber (NR) may be used. Using EPDM or IIR or a material comprising a mixture of the two permits a higher heat resistance because of the properties of such materials. EPDM refers to ethylene-α-olefin-unconjugated diene copolymer (propylene as α-olefin).

In a preferred embodiment of the intermediate rubber layer, such layer is formed to a thickness of 0.1–0.25 mm through the application of rubber cement. Rubber cement has a Mooney viscosity of 0, and can be sufficiently impregnated between the lower yarn strands of the lower yarn layer, thereby preventing displacement of the lower yarn. By forming the intermediate rubber layer formed from rubber cement to the above thickness, the intermediate rubber layer is sufficiently impregnated among the strands of the upper yarn of the upper yarn layer, and the desired operation and effect can be obtained.

DESCRIPTION OF THE PREFERRED EMBODIMENTS

A. First Embodiment (1) Basic Construction of Brake Hose 10

Figure 1:
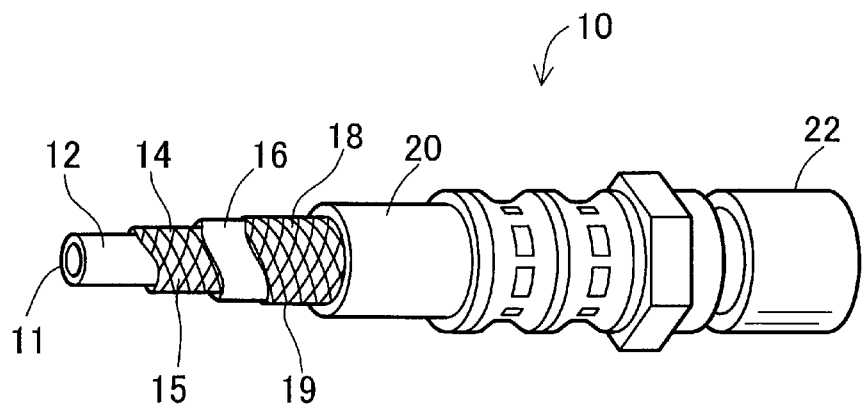
FIG. 1 is a partial cutaway perspective view of the brake hose pertaining to one embodiment of the present invention.
Figure 2:
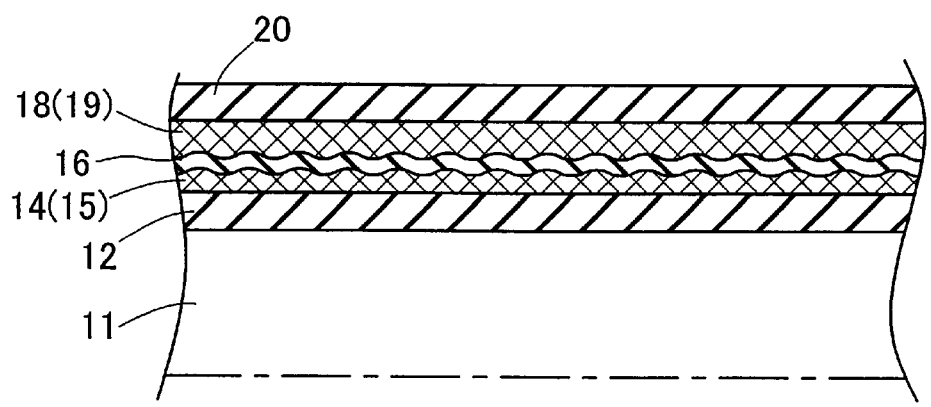
FIG. 2 is a half-sectional view of the main components of the brake hose.

FIG. 1 is a partial cutaway perspective view of a brake hose 10 pertaining to a first embodiment of the present invention. FIG. 2 is a partial cross-sectional view of the brake hose 10. With reference to FIG. 1 and FIG. 2, the brake hose 10 is used in order to connect a master cylinder used to carry out hydraulic braking in an automobile not shown in the figures to a hydraulic device mounted near each tire, and comprises five layers in order to withstand the brake fluid pressure. The brake hose 10 includes an inner tube rubber layer 12 having a flow path 11, a lower yarn layer 14, an intermediate rubber layer 16, an upper yarn layer 18, and a cover rubber layer 20. A mouthpiece 22 is fixed to an end of the brake hose 10 via caulking.

(2) Construction of Various Layers of the Brake Hose 10

In order to give the brake hose such properties as pressure resistance against the brake fluid pressure of up to 50 MPa, durability and expansion resistance, the materials, thickness and other parameters of each layer are established.

(2)-1 Inner Tube Rubber Layer 12

Primarily in order to achieve oil resistance, the inner tube rubber layer 12 is made of ethylene-propylene-diene copolymer rubber (EPDM), styrene-butadiene rubber copolymer (SBR) or the like, and has an inner diameter of 3.0–3.4 mm and a thickness of 0.5–1.0 mm.

(2)-2 Lower Yarn Layer 14

The lower yarn layer 14 comprises a wound yarn including two or three strands of a fiber such as vinylon, polyethylene terephthalate, polyethylene napthtalate or rayon, and is formed by braiding the yarn around the inner tube rubber layer 12 using a braid count of 20 count or 24 count. A braid count of 20 count or 24 count means that the yarn is drawn from bobbins located at 20 or 30 locations and braided around the inner tube rubber layer 12, as described below.

It is preferred that the lower yarn of the lower yarn layer constitute a yarn having a tensile strength of 6.5 g or more per decitex and a elongation of 3.5±1% at a tensile load of 2.7 g.

(2)-3 Intermediate Rubber Layer 16

The intermediate rubber layer 16 is a layer intended to prevent displacement of the lower yarn layer 14 and the upper yarn layer 18. The upper yarn layer 18 is formed by winding a sheet made from a rubber material around the lower yarn layer 14 or by applying rubber cement onto the lower yarn layer 14.

As the rubber material for the sheet, EPDM, isobutylene-isoprene copolymer rubber (IIR) or natural rubber (NR) may be used. Using EPDM or IIR or a material comprising a mixture of the two permits a higher heat resistance because of the properties of such materials.

It is preferred that the Mooney viscosity of the intermediate rubber layer 16 be 10–40 Mv (minimum Mooney value) at 145° C. The Mooney viscosity is a value reflecting measurement of the viscosity of non-vulcanized rubber at 145° C. based on the K6300 test promulgated under JIS (Japanese Industrial Standards). The Mooney viscosity is set to the above range in order to ensure that the intermediate rubber layer 16 fills in the gaps between the strands of the lower yarn 15 and the strands of the upper yarn 19, thereby preventing displacement of the lower yarn layer 14 and the upper yarn layer 18. When a sheet material having a Mooney value of 10–40 Mv (minimum Mooney value) at 145° C. is used in order to increase the effect of the intermediate rubber layer 16, the intermediate rubber layer 16 fills in the gaps between the strands of the lower yarn of the lower yarn layer 14 and the strands of the upper yarn of the upper yarn layer 18 when the upper fiber layer 19 is braided, thereby inhibiting displacement of the yarn of the lower yarn layer 14 and the upper yarn layer 18. Therefore, when internal pressure is generated, there is minimal displacement of the yarn of the lower yarn layer 14 and the upper yarn layer 18, and durability and cubical expansion resistance can be improved. The Mooney viscosity for the rubber material used for the intermediate rubber layer 16 may be adjusted by, for example, changing the type of carbon added to the rubber material.

It is preferred that the intermediate rubber layer 16 has a thickness of 0.1–0.25 mm. This is because if the thickness is less than 0.1 mm, the intermediate rubber layer 16 becomes too thin and cannot be braided around the lower yarn layer 14, while if the thickness exceeds 0.25 mm, the intermediate rubber layer is so thick that the intermediate rubber layer 16 functions as an elastic layer that permits displacement of the lower yarn layer 14, and the displacement-inhibiting effect of the lower yarn layer is diminished.

Where rubber cement is used for the intermediate rubber layer 16, the Mooney value of the rubber cement is close to zero, and the above thickness is obtained by applying the rubber cement in several coats (for example, in at least three coats). The rubber cement comprises a blend of IIR and EPDM dissolved in trichloroethane.

(2)-4 Upper Yarn Layer 18

The upper yarn layer 18 is formed by braiding around the intermediate rubber layer 16 the upper yarn 19 obtained by winding together two or three fiber threads of vinylon, polyethylene terephthalate, polyethylene napththalate or rayon, using a braid count of 20 count or 24 count. The upper yarn 19 is formed by bundling together 200–400 filament threads and braiding yarn obtained by winding together two or three such filament threads using a braid count of 20 count or 24 count.

For the upper yarn 19, a yarn that has a lower elongation than the lower yarn 15, such as a yarn having a tensile strength of 8.5 g per decitex and a elongation of 3.0±1% at a tensile load of 2.7 g, can be used. Yarns made from the same material but having a different tensile force can be manufactured by subjecting the yarn to an elongation and heating process in which the yarn is pulled while being heated.

(2)-5 Cover Rubber Layer 20

Mainly in order to achieve ozone resistance, the cover rubber layer 20 is made of a material such as EPDM or a blend of EPDM and CR. The cover rubber layer 20 has a thickness of 0.5–1.0 mm.

(3) Brake Hose 10 Manufacturing Method

The manufacturing method for the brake hose 10 will now be described. The brake hose 10 can be manufactured using public-domain methods, i.e., by carrying out a rubber extrusion process, a fiber yarn braiding process and a vulcanization process.

(3)-1 Hose Manufacturing Apparatus 30

Figure 3:
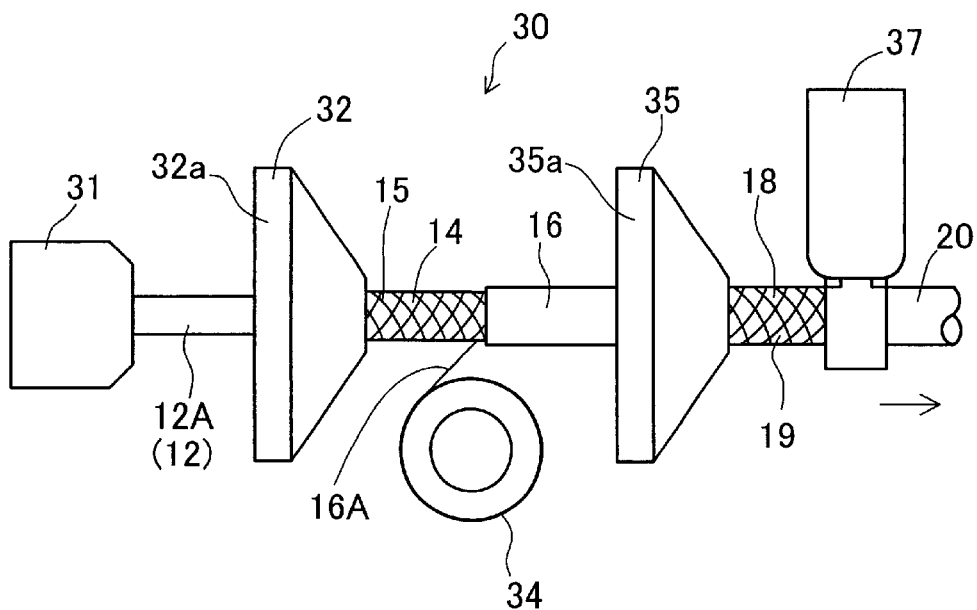
FIG. 3 is an explanatory drawing describing a hose manufacturing apparatus.

FIG. 3 shows a hose manufacturing apparatus 30. With reference to FIG. 3, the hose manufacturing apparatus 30 includes a first extruding device 31, a first braiding device 32, an intermediate sheet forming device 34, a second braiding device 35 and a second extruding device 37. The first extruding device 31 is a device that forms the inner tube rubber layer 12 by extruding a rubber material. The first braiding device 32 includes bobbin carriers (not shown in the figure) mounted to a drum 32a, and forms the lower yarn layer 14 by braiding the lower yarn 15 around the extruded inner tube body 12A while drawing the lower yarn 15 from the bobbin carriers. The intermediate sheet forming device 34 draws from a roller a sheet material 16A used to form the intermediate rubber layer 16 around the lower yarn layer 14 braided by the first braiding device 32. The second braiding device 35 has a construction essentially identical to that of the first braiding device 32. The second braiding device 35 includes bobbin carriers (not shown in the figure) mounted to a drum 35a, and forms the upper yarn layer 18 by braiding the upper yarn 19 around the intermediate rubber layer 16 while drawing the upper yarn 19 from the bobbin carriers. The second extruding device 37 forms the cover rubber layer 20 by extruding a rubber material and covering the rubber material over the upper yarn layer 18.

(3)-2 Brake Hose 10 Manufacturing Process

The series of manufacturing steps by which the brake hose 10 is manufactured by the hose manufacturing apparatus 30 will now be described. First, the inner tube rubber layer 12 is formed via extrusion of a rubber material by the first extruding device 31. During this process, a mandrel (not shown in the figure) is inserted inside the inner tube rubber layer 12. Next, the lower yarn layer 14 is formed by drawing lower yarn 15 from the bobbins while the drum 32a of the first braiding device 32 rotates and braiding the lower yarn 15 around the extruded inner tube rubber layer 12. During this process, in order to braid the lower yarn layer 14 to a braid count of 20, for example, the lower yarn 15 is drawn from bobbins that are located at 20 locations and rotate in opposite directions. The intermediate rubber layer 20 is then formed by supplying the sheet material 16A from the intermediate sheet forming device 34 over the lower yarn layer 14. The upper yarn layer 18 is then braided around the intermediate rubber layer 16 by drawing upper yarn 19 from the bobbins while the drum 35a of the second braiding device 35 rotates. Finally, the cover rubber layer 20 is formed by extruding a rubber material from the second extruding device 37 over the upper yarn layer 18.

Where rubber cement is used for the intermediate rubber layer, such layer is formed by applying and drying the rubber cement several times after the upper yarn layer 18 has been braided.

The vulcanization process is then performed. Vulcanization is carried out for 15–60 minutes at 120–170° C. Due to the heating that occurs during the vulcanization process, the inner tube rubber layer 12, the intermediate rubber layer 16 and the cover rubber layer 20 are adhere together. Consequently, the brake hose 10 is integrally formed.

(4) Brake Hose Operation and Effect (4)-1 Intermediate Rubber Layer Viscosity Test Durability and expansion resistance (i.e., the amount of cubical expansion) at various levels of viscosity for the intermediate rubber layer were investigated. The test was performed using intermediate rubber layers having a Mooney viscosity of 0–60 Mv (the lowest Mooney value) at a temperature of 145° C. The sample having a Mooney viscosity of 0 was a sample in which rubber cement was used to form the intermediate rubber layer. The other intermediate rubber layers were formed using a rubber sheet material, and were made of EPDM to have a 0.2 mm thickness. The other dimensions of the brake hose were as follows: the outer diameter was 10.5 mm, the length was 305 mm, the inner diameter of the inner tube rubber layer was 3.2 mm, the thickness of the inner tube rubber layer was 0.8 mm, and the thickness of the cover rubber layer was 0.8 mm. The lower yarn and upper yarn were made of polyester (PET) fiber.

Figure 4:
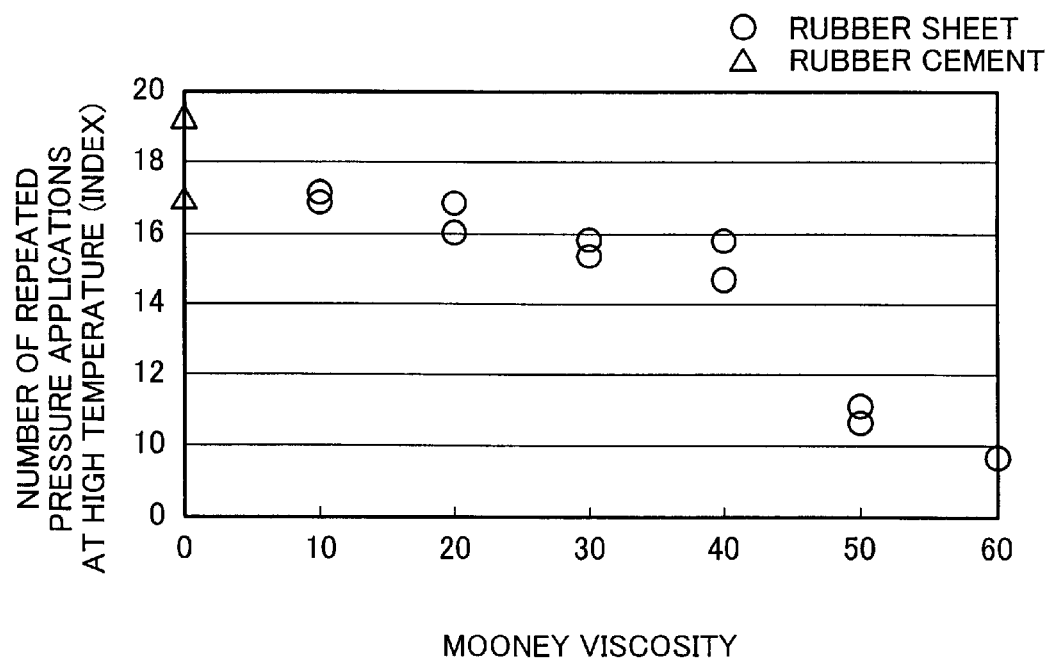
FIG. 4 is a graph showing the relationship between the Mooney viscosity of the intermediate rubber layer and hose durability.

Durability testing was performed via repeated pressure testing in which brake fluid was actually sent through the brake hose. In other words, under an ambient temperature of 120° C., brake fluid was injected at cycles of 0.3 Hz at a fluid pressure ranging from 0 MPa to 20 MPa, and the number of injections required for product rupture was determined. The results are shown in FIG. 4. In the graph of FIG. 4, the vertical axis indicates the number of times fluid pressure applied, while the horizontal axis indicates the thickness of the intermediate rubber layer. As can be seen from FIG. 4, durability increased significantly when the Mooney viscosity was 40 Mv or less (minimum Mooney value) at 145° C., compared with when the Mooney viscosity exceeded 50 Mv (minimum Mooney value) at 145° C. as in the comparison examples. This is because an intermediate rubber layer with low viscosity fills in the gaps between the strands of the lower yarn of the lower yarn layer, thereby reducing lower yarn displacement and improving durability.

(4)-2 Intermediate rubber layer thickness test

The thickness test for the intermediate rubber layer was performed by creating brake hoses having different intermediate rubber layer thicknesses, and measuring durability and cubical expansion for each brake hose. The Mooney viscosity of the intermediate rubber layer in these test samples was set at 0.3 Mv (minimum Mooney value) at 145° C.

Figure 5:
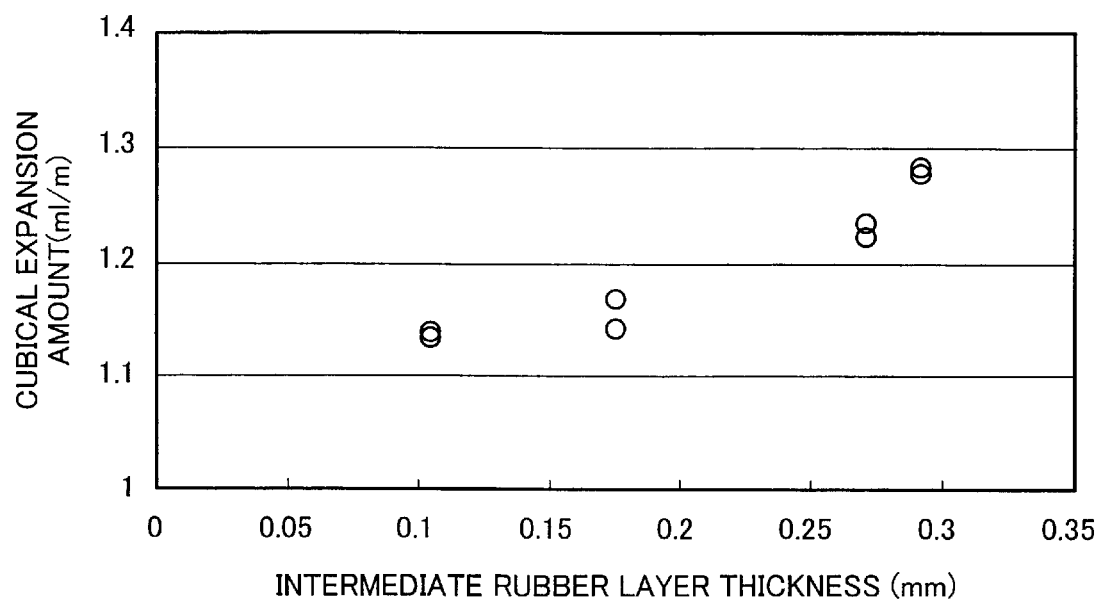
FIG. 5 is a graph showing the relationship between the thickness of the intermediate rubber layer and the amount of cubical expansion.

In the cubical expansion amount test, the amount of cubical expansion was determined by measuring in accordance with JIS standard 2601 the change in the internal volume of a 305 mm-length of brake hose when oil pressure of 10.3 MPa was generated therein. The results are shown in FIG. 5. FIG. 5 is a graph in which the vertical axis indicates the amount of cubical expansion, while the horizontal axis indicates the intermediate rubber layer thickness.

Figure 6:
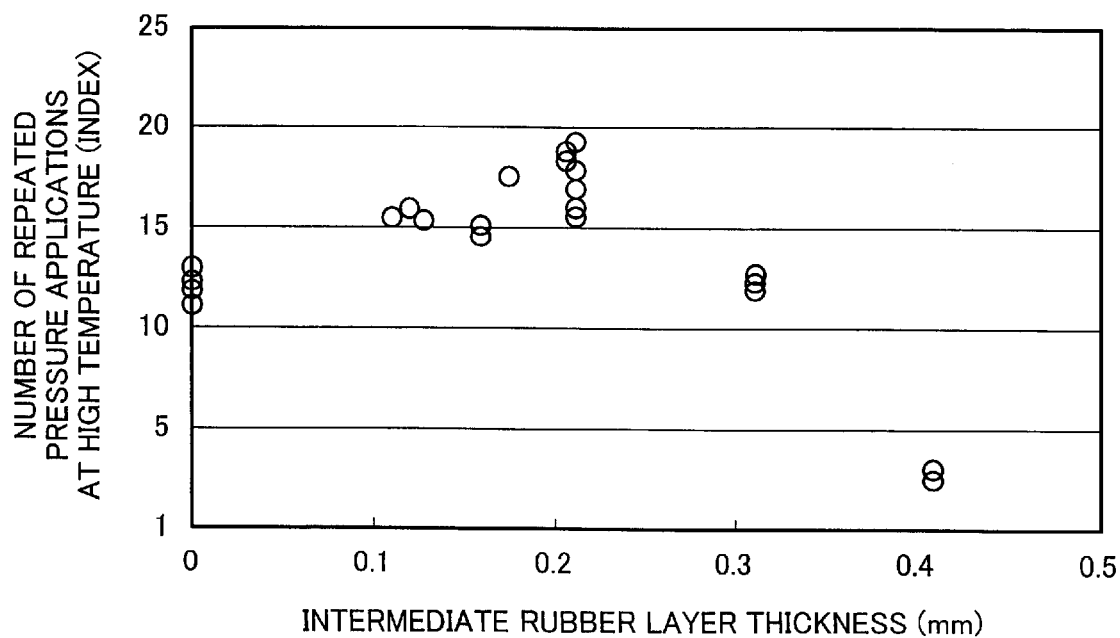
FIG. 6 is a graph showing the relationship between the thickness of the intermediate rubber layer and hose durability.
Figure 7:
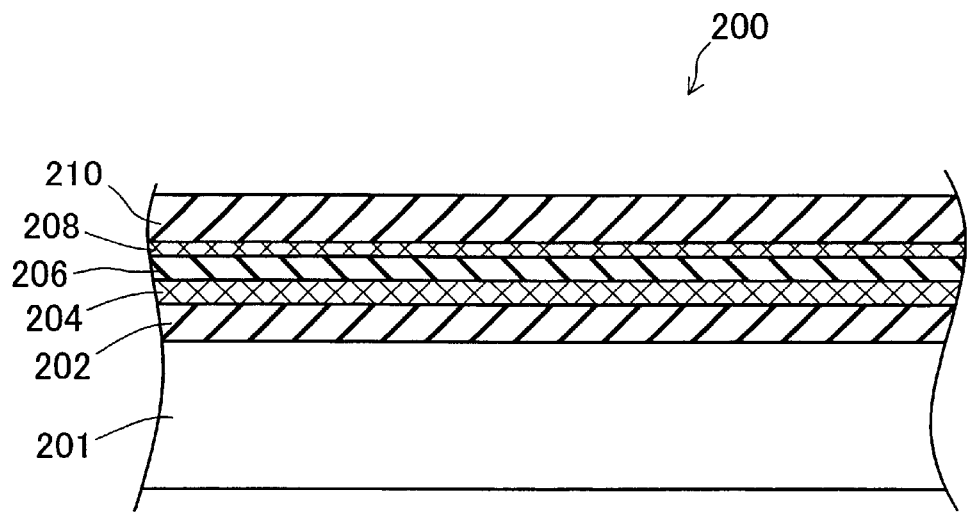
FIG. 7 is a half-sectional view showing the brake hose of the conventional art.

The durability test was performed in the same manner as described above. The results thereof are shown in FIG. 6. FIG. 6 is a graph in which the vertical axis indicates the number of times fluid pressure applied, while the horizontal axis indicates the intermediate rubber layer thickness.

As shown in FIGS. 5 and 6, in both the cubical expansion amount test and the durability test the intermediate rubber layer provided low cubical expansion and superior durability when the thickness thereof did not exceed 0.25 mm. This is because when the thickness of the intermediate rubber layer was reduced below the 0.3 mm or greater thickness of the intermediate rubber layer of the conventional art, the amount of expansion of the lower yarn layer due to the rubber elasticity of the intermediate rubber layer declined as well, thereby reducing the amount of displacement of the lower yarn layer.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A brake hose including reinforcing layers in a rubber base, the brake hose comprising:
   an inner tube rubber layer having a flow path for flowing fluid;
   a lower yarn layer formed by braiding first yarns around the inner tube rubber layer;
   an intermediate rubber layer covering the lower yarn layer;

an upper yarn layer formed by braiding second yarns around the intermediate rubber layer; and a cover rubber layer covering the upper yarn layer, wherein the intermediate rubber layer is formed from a rubber material having a Mooney viscosity of 10–40 Mv (minimum Mooney value) at 145° C.

2. The brake hose according to claim 1, wherein the intermediate rubber layer is formed from a rubber sheet.

3. The brake hose according to claim 2, wherein the rubber sheet is made of a material selected from a group including EPDM and a blend that includes EPDM and IIR.

4. The brake hose according to claim 3, wherein the intermediate rubber layer has a thickness of 0.1–0.25 mm.

5. The brake hose according to claim 1, wherein the intermediate rubber layer is formed by repeatedly applying liquid rubber to the lower yarn layer and curing the liquid rubber.

6. The brake hose according to claim 5, wherein the intermediate rubber layer has a thickness of 0.1–0.25 mm.

7. The brake hose according to claim 6, wherein the intermediate rubber layer is made of a material selected from a group including EPDM and a blend that includes EPDM and IIR.

8. A brake hose including reinforcing layers in a rubber base, the brake hose comprising:

an inner tube rubber layer;

a lower yarn layer formed around the inner tube rubber layer; and an intermediate rubber layer covering the lower yarn layer;

wherein the intermediate rubber layer is formed from a rubber material having a Mooney viscosity of 10–40 Mv (minimum Mooney value) at 145° C. and is formed from a rubber sheet.

9. The brake hose according to claim 8, wherein the rubber sheet is made of a material selected from a group including EPDM and a blend that includes EPDM and IIR.

10. The brake hose according to claim 9, wherein the intermediate rubber layer has a thickness of 0.1–0.25 mm.

11. A brake hose including reinforcing layers in a rubber base, the brake hose comprising:

an inner tube rubber layer;

a lower yarn layer formed around the inner tube rubber layer; and an intermediate rubber layer covering the lower yarn layer;

wherein the intermediate rubber layer is formed from a rubber material having a Mooney viscosity of 10–40 Mv (minimum Mooney value) at 145° C. and wherein the intermediate rubber layer is further formed by repeatedly applying liquid rubber to the lower yarn layer and curing the liquid rubber.

12. The brake hose according to claim 11, wherein the intermediate rubber layer has a thickness of 0.1–0.25 mm.

13. The brake hose according to claim 12, wherein the intermediate rubber layer is made of a material selected from a group including EPDM and a blend that includes EPDM and IIR.

* * * * *